(12) United States Patent
Lalaoua (10) Patent No.: US 10,583,322 B2
(45) Date of Patent: Mar. 10, 2020

(54) PIVOTING ABDOMINAL EXERCISE MACHINE

(71) Applicant: Nabile Lalaoua, Las Vegas, NV (US)

(72) Inventor: Nabile Lalaoua, Las Vegas, NV (US)

( * ) Notice: Subject to any disclaimer, the term of this patent is extended or adjusted under 35 U.S.C. 154(b) by 107 days.

(21) Appl. No.: 15/759,526

(22) PCT Filed: Sep. 27, 2016

(86) PCT No.: PCT/IB2016/055761
§ 371 (c)(1),
(2) Date: Mar. 13, 2018

(87) PCT Pub. No.: WO2017/046786
PCT Pub. Date: Mar. 23, 2017

(65) Prior Publication Data
US 2019/0111310 A1  Apr. 18, 2019

Related U.S. Application Data (63) Continuation-in-part of application No. 15/265,768, filed on Sep. 14, 2016, now Pat. No. 9,789,352, and
(Continued)

(51) Int. Cl.
*A63B 23/02* (2006.01)
*A63B 21/04* (2006.01)
(Continued)

(52) U.S. Cl.
CPC ........... *A63B 23/0211* (2013.01); *A61H 1/00* (2013.01); *A61H 15/00* (2013.01); *A63B 1/00* (2013.01);
(Continued)

(58) Field of Classification Search
CPC ... A63B 23/0211; A63B 1/00; A63B 21/4047; A63B 21/023; A63B 23/0216;
(Continued)

(56) References Cited

U.S. PATENT DOCUMENTS

| 4,494,662 A | 1/1985 | Clymer |
| 5,573,485 A * | 11/1996 | Geschwender .... A63B 23/0233 482/112 |

(Continued)

FOREIGN PATENT DOCUMENTS

| CN | 202169048 U | 3/2012 |
| CN | 202682678 U | 1/2013 |
| WO | 2015/057526 A1 | 4/2015 |

*Primary Examiner* — Gary D Urbiel Goldner (57) ABSTRACT

A pivoting abdominal exercise machine is used to exercise and strengthen core muscles. The machine includes a hinged frame, a plurality of back supports, and a base stand. The plurality of back supports is connected along the hinged frame. Together, the hinged frame and the plurality of back supports are used to interact with and brace portions of the user's back as the user performs an exercise. The plurality of back supports may either be cushioned pads or rollers. The base stand is mounted to the hinged frame through an elastic pivot resistor. The elastic pivot resistor allows the user to rock, tilt, or twist about the base stand. A frame-grasping assembly is mounted to the hinged frame. The frame-grasping assembly allows the user to hold onto the device and maintain stability while performing exercises.

13 Claims, 11 Drawing Sheets

Related U.S. Application Data a continuation-in-part of application No. PCT/IB2016/054213, filed on Jul. 14, 2016, and a continuation-in-part of application No. 15/204,863, filed on Jul. 7, 2016, now Pat. No. 9,744,401, and a continuation-in-part of application No. 15/265,791, filed on Sep. 14, 2016, now Pat. No. 9,789,351, and a continuation-in-part of application No. 15/187,564, filed on Jun. 20, 2016, now abandoned, and a continuation-in-part of application No. 15/258,047, filed on Sep. 7, 2016, now Pat. No. 10,143,881.

(60) Provisional application No. 62/283,840, filed on Sep. 14, 2015.

(51) Int. Cl.

| | | |
|---|---|---|
| *A61H 1/00* | (2006.01) | |
| *A63B 21/00* | (2006.01) | |
| *A61H 15/00* | (2006.01) | |
| *A63B 21/055* | (2006.01) | |
| *A63B 21/068* | (2006.01) | |
| *A63B 21/06* | (2006.01) | |
| *A63B 21/02* | (2006.01) | |
| *A63B 1/00* | (2006.01) | |
| *F16B 7/10* | (2006.01) | |
| *A63B 23/00* | (2006.01) | |

(52) U.S. Cl.
CPC ........ *A63B 21/023* (2013.01); *A63B 21/0414* (2013.01); *A63B 21/0552* (2013.01); *A63B 21/068* (2013.01); *A63B 21/0615* (2013.01); *A63B 21/4035* (2015.10); *A63B 21/4039* (2015.10); *A63B 21/4047* (2015.10); *A63B 23/0216* (2013.01); *A61H 2015/0014* (2013.01); *A61H 2201/0161* (2013.01); *A61H 2201/1261* (2013.01); *A61H 2201/1284* (2013.01); *A61H 2201/1604* (2013.01); *A61H 2201/1623* (2013.01); *A61H 2201/1633* (2013.01); *A61H 2201/1635* (2013.01); *A61H 2201/1669* (2013.01); *A63B 2023/003* (2013.01); *A63B 2208/0228* (2013.01); *A63B 2210/50* (2013.01); *A63B 2225/09* (2013.01); *F16B 7/105* (2013.01)

(58) Field of Classification Search
CPC ............ A63B 21/4039; A63B 21/0615; A63B 21/068; A63B 21/0552; A63B 21/4035; A63B 21/0414; A63B 2023/003; A63B 2210/50; A63B 2225/09; A63B 2208/0228; A61H 15/00; A61H 1/00; A61H 2201/1669; A61H 2201/1635; A61H 2201/1633; A61H 2201/1623; A61H 2201/1604; A61H 2201/1284; A61H 2201/1261; A61H 2201/0161; A61H 2015/0014; A61H 23/00; A61H 2205/081; A61H 2201/0119; F16B 7/105
See application file for complete search history.

(56) References Cited

U.S. PATENT DOCUMENTS

| | | | |
|---|---|---|---|
| 5,772,614 A * | 6/1998 | Lindquist | A63B 21/00196 601/116 |
| 5,871,425 A | 2/1999 | Gvoich | |
| 6,231,489 B1 * | 5/2001 | McBride | A63B 21/068 482/132 |
| 6,312,401 B1 * | 11/2001 | Smith | A61H 1/0218 482/142 |
| 6,716,144 B1 * | 4/2004 | Shifferaw | A63B 21/023 297/161 |
| 6,971,977 B1 * | 12/2005 | Chen | A63B 21/0552 297/258.1 |
| 7,125,366 B1 * | 10/2006 | Yeh | A63B 21/055 482/140 |
| 7,326,159 B2 * | 2/2008 | Rong | A63B 21/0004 482/140 |
| 9,446,276 B2 * | 9/2016 | Araujo | A63B 21/00181 |
| 9,757,608 B2 * | 9/2017 | Davenport | A63B 21/4035 |
| 9,789,351 B2 * | 10/2017 | Lalaoua | A63B 21/0552 |
| 9,789,352 B2 * | 10/2017 | Lalaoua | A63B 23/0211 |
| 9,789,353 B2 * | 10/2017 | Lalaoua | A63B 21/0407 |
| D814,577 S * | 4/2018 | Lalaoua | D21/688 |
| 2006/0068979 A1 * | 3/2006 | Hsieh | A63B 21/00047 482/140 |
| 2010/0099542 A1 | 4/2010 | Fernandez et al. | |
| 2012/0058867 A1 | 3/2012 | Mishan et al. | |
| 2013/0045844 A1 | 2/2013 | Huang | |
| 2015/0105226 A1 * | 4/2015 | Lalaoua | A63B 23/0205 482/140 |
| 2015/0202484 A1 * | 7/2015 | Lalaoua | A63B 21/025 482/127 |

* cited by examiner

PIVOTING ABDOMINAL EXERCISE MACHINE

The current application claims priority to U.S. patent application 62/283,840 filed Sep. 14, 2015, U.S. patent application Ser. No. 15/187,564 filed Jun. 20, 2016, U.S. patent application Ser. No. 15/204,863 filed Jul. 7, 2016, PCT patent application PCT/IB2016/054213 filed Jul. 14, 2006, U.S. patent application Ser. No. 15/258,047 filed Sep. 7, 2016, U.S. patent application Ser. No. 15/265,768 filed Sep. 14, 2016, U.S. patent application Ser. No. 15/265,791 filed Sep. 14, 2016.

FIELD OF THE INVENTION

The present invention relates generally to exercise devices. More specifically, the present invention is a pivoting abdominal exercise machine that is used to strengthen core muscles through pivoting motions about a stable base.

BACKGROUND OF THE INVENTION

Exercising core muscles is a common way to stay physically fit. Specific exercises that target core muscles, including sit-ups, crunches, and planks can be useful for strengthening abdominal muscles but can also lead to injuries. Further, performing such exercises on hard surfaces can prove to be uncomfortable. Existing workout devices or machines are typically more comfortable but only move in one direction. This limits what exercises a user can perform. Further, repeatedly performing the same exercises can lead to decreased results when compared to varying exercise routines.

Accordingly, there is a present need for an exercise machine capable of comfortably and safely supporting a user through the performance of various abdominal exercises. The present invention is a pivoting abdominal exercise machine that supports users during core-strengthening exercises. The present invention uses a hinged frame that bends with the user to provide stability throughout the user's full range of motion. The present invention supports the user through a stable base stand about which the user is able to pivot. Further, the present invention resists the movements of the user in order to enhance the strengthening of core muscles.

DETAILED DESCRIPTION OF THE INVENTION

All illustrations of the drawings are for the purpose of describing selected versions of the present invention and are not intended to limit the scope of the present invention.

With reference to FIGS. 1-4, the present invention is a pivoting abdominal exercise machine which is used to strengthen a user's core muscles. The present invention comprises a hinged frame 1, a plurality of back supports 6, a base stand 15, and a frame-grasping assembly 16. The hinged frame 1 is used to support the weight of the user during exercise. Further, the hinged frame 1 is designed to fold during exercise in order to move as the user moves. The hinged frame 1 comprises a base beam 2 and a pivoting beam 5. During exercise, the user lays along the hinged frame 1 and is supported by the plurality of back supports 6. The base beam 2 is mostly used for supporting the user's lower back, while the pivoting beam 5 is used to support the user's mid and upper back. The pivoting beam 5 is hingedly and adjacently connected to the base beam 2. This arrangement between the base beam 2 and the pivoting beam 5 allows the hinged frame 1 to bend as the user performs crunches or similar exercises while using the present invention. The frame-grasping assembly 16 is adjacently mounted to the pivoting beam 5, opposite to the base beam 2. The frame-grasping assembly 16 provides a means by which the user can hold onto the present invention while exercising. This helps to ensure that the hinged frame 1 moves with the user and constantly provides support for the user. The plurality of back supports 6 is used to evenly distribute the weight of the user along the hinged frame 1. The plurality of back supports 6 is laterally mounted to the hinged frame 1 and is distributed along the hinged frame 1. This helps to maximize comfort and support. The base beam 2 is pivotably mounted onto the base stand 15. The base stand 15 provides a stable foundation upon which the hinged frame 1 is able to pivot. As a result, the user is able to perform various exercises with the present invention.

Figure 1:
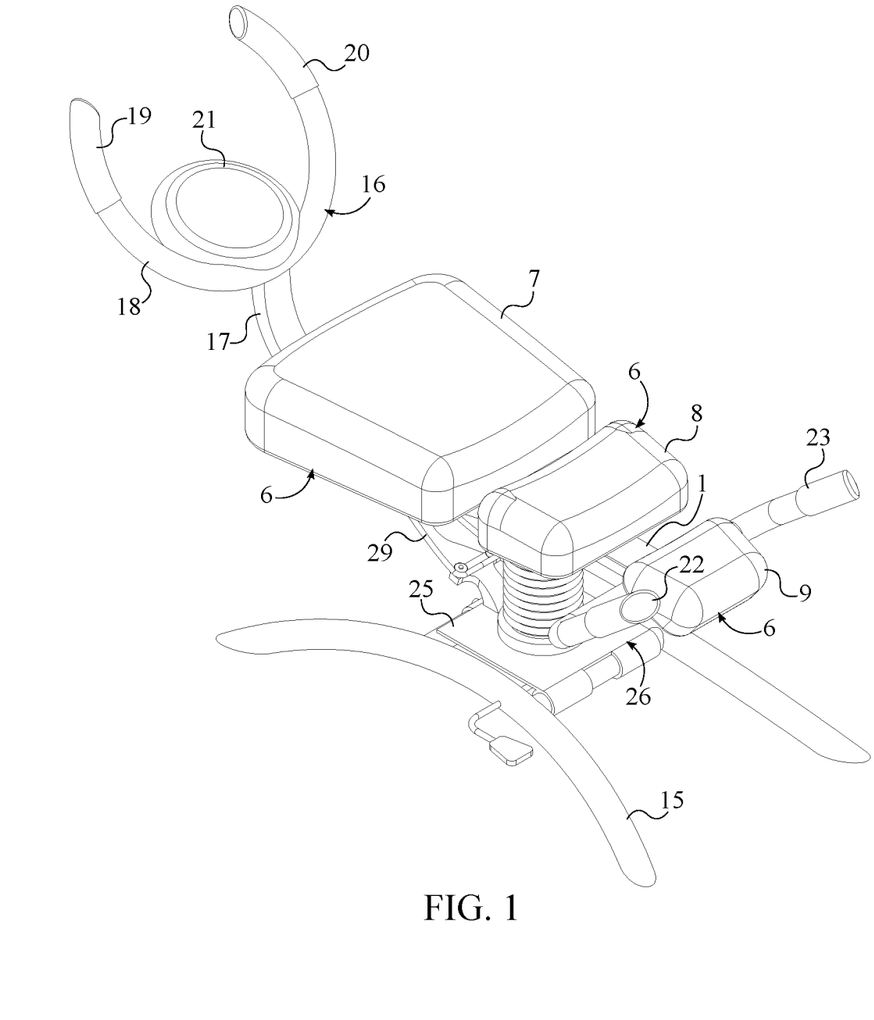
FIG. 1 is a right perspective view of a first embodiment of the present invention, wherein the first embodiment of the present invention includes cushioned pads.
Figure 4:
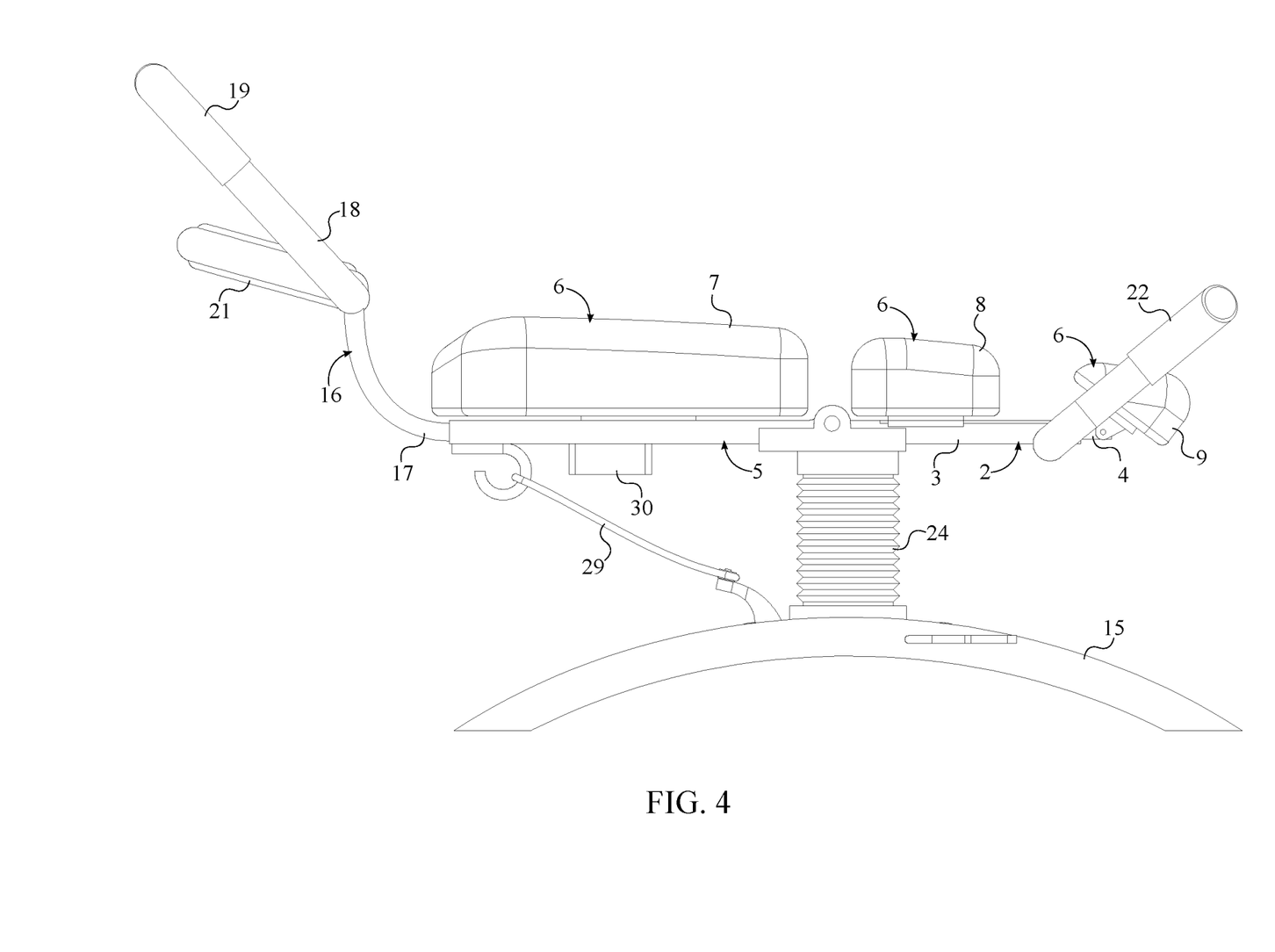
FIG. 4 is a front view of the first embodiment of the present invention.

In reference to FIG. 1 and FIG. 4, the frame-grasping assembly 16 comprises a length-adjusting bar 17, a handlebar 18, a first grip 19, a second grip 20, and a headrest 21. The length-adjusting bar 17 is used to selectively position the headrest 21 and the handlebar 18 with respect to the pivoting beam 5. The length-adjusting bar 17 is telescopically mounted into the pivoting beam 5. As a result, the length-adjusting bar 17 may be slid into or out of the pivoting beam 5 so that the headrest 21 may comfortably support the user's head and neck area. This also allows the user to adjust the handlebar 18 such that the first grip 19 and the second grip 20 may be easily reached while exercising. The handlebar 18 is connected adjacent to the length-adjusting bar 17, opposite to the pivoting beam 5. The handlebar 18 is used to maneuver the hinged frame 1 during exercises. The first grip 19 and the second grip 20 are used to prevent the user's hands from slipping while maneuvering the handlebar 18. The first grip 19 is connected adjacent to the handlebar 18. The second grip 20 is connected adjacent to the handlebar 18, opposite to the first grip 19. The headrest 21 is laterally connected about the handlebar 18 and is used to support the user's head and neck area during exercise. The headrest 21 is positioned in between the first grip 19 and the second grip 20. This arrangement between the headrest 21, the first grip 19, and the second grip 20 allows the user to comfortably align their head and neck with the hinged frame 1, while holding onto the first grip 19 and the second grip 20.

In reference to FIG. 1, in a first embodiment of the present invention, the plurality of back supports 6 comprises a first cushioned pad 7 and a second cushioned pad 8. The first cushioned pad 7 and the second cushioned pad 8 are used to comfortably support the user's back during exercise. The first cushioned pad 7 is laterally connected to the pivoting beam 5. This arrangement allows the first cushioned pad 7 to support the user's upper back. The second cushioned pad 8 is laterally positioned on the base beam 2 and is slidably mounted along the base beam 2. This arrangement allows the second cushioned pad 8 to support the middle portion of the user's back by sliding with the user throughout an exercise.

In reference to FIG. 1 and FIG. 4, the base beam 2 comprises a base-supporting beam 3 and a base-adjusting beam 4. The base-adjusting beam 4 is telescopically mounted into the base-supporting beam 3 such that the length of the base beam 2 may be increased or decreased. This arrangement allows the present invention to be adjusted to support users of varying heights. The plurality of back supports 6 comprises a third cushioned pad 9. The third cushioned pad 9 is used to support the user's lower back. The third cushioned pad 9 is laterally connected to the base-adjusting beam 4. This arrangement allows the third cushion to be adjusted to align with the user's lower back by sliding the base-adjusting beam 4 relative to the base-supporting beam 3.

Figure 2:
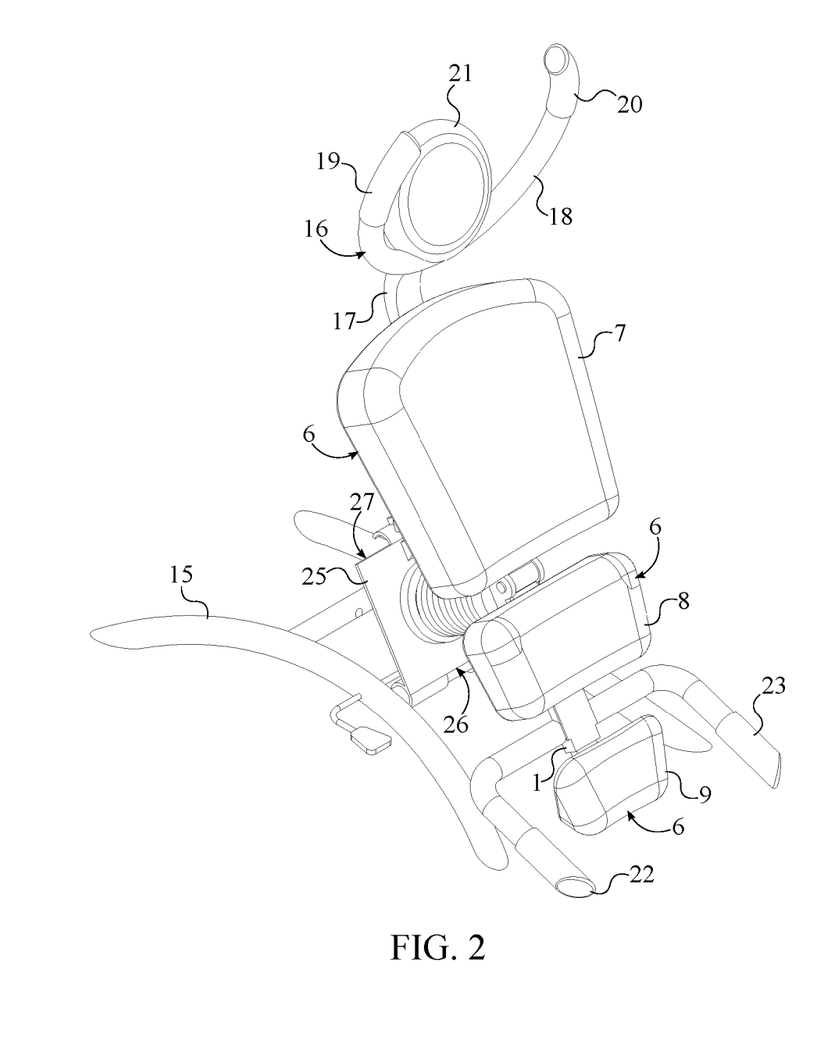
FIG. 2 is a right perspective view of the first embodiment of the present invention with the mounting plate unlocked from the base stand.
Figure 3:
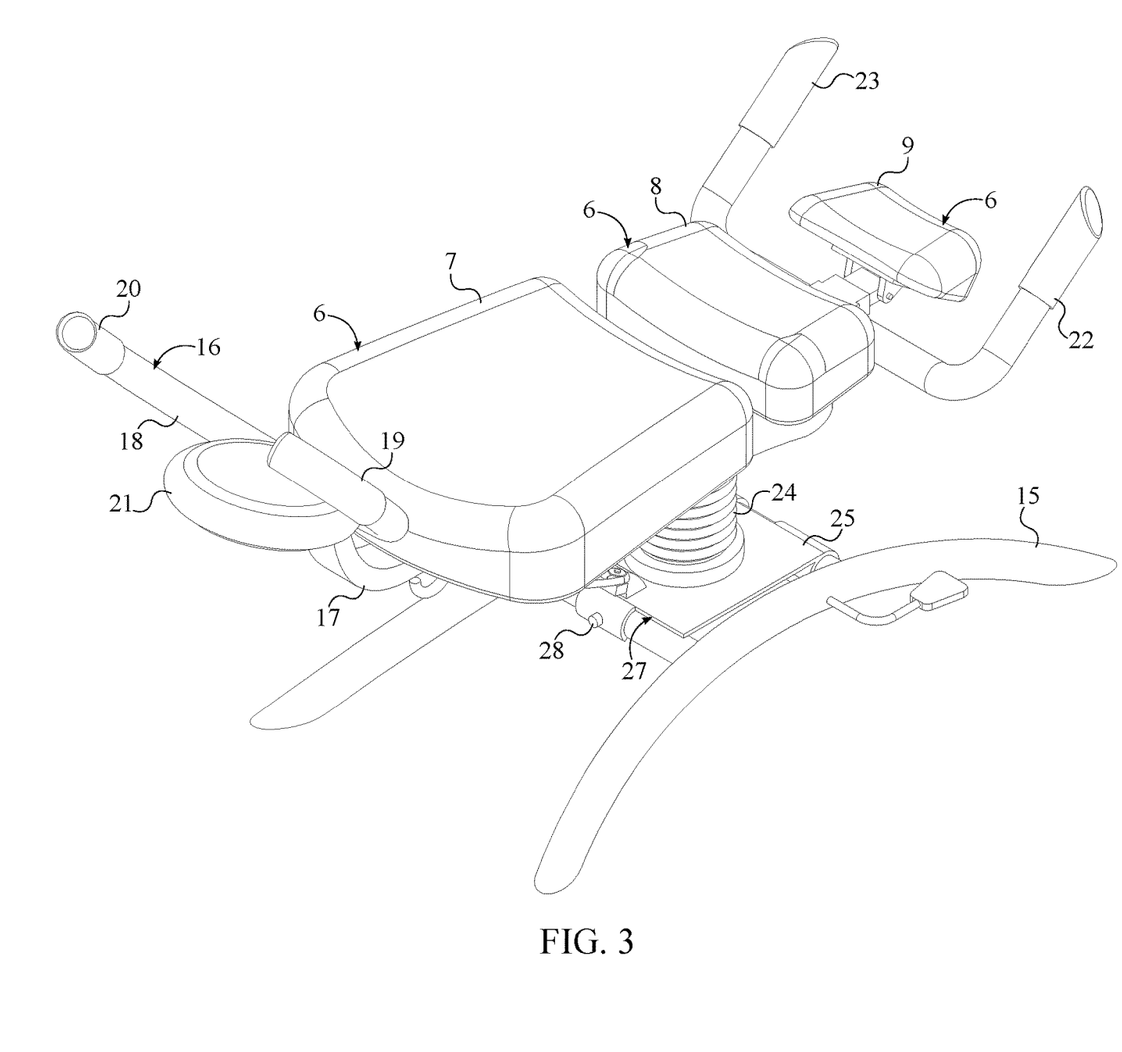
FIG. 3 is a left perspective view of the first embodiment of the present invention.

In reference to FIGS. 1-3, the present invention further comprises a first handle 22 and a second handle 23. In addition to the first grip 19 and the second grip 20, the first handle 22 and the second handle 23 are used to help the user maneuver the hinged frame 1 and maintain balance during exercises. The first handle 22 is laterally connected to the base beam 2. The second handle 23 is laterally connected to the base beam 2, opposite to the first handle 22. This arrangement positions the first handle 22 and the second handle 23 such the user is able to hold onto the present invention with both their left and right hands. The first handle 22 and the second handle 23 are positioned offset from the pivoting beam 5 along the base beam 2. The positioning of the first grip 19, the second grip 20, the first handle 22, and the second handle 23 allows the user to hold onto the present invention at either end of the hinged frame 1, depending on the exercise the user is performing or the user's preference.

Figure 6:
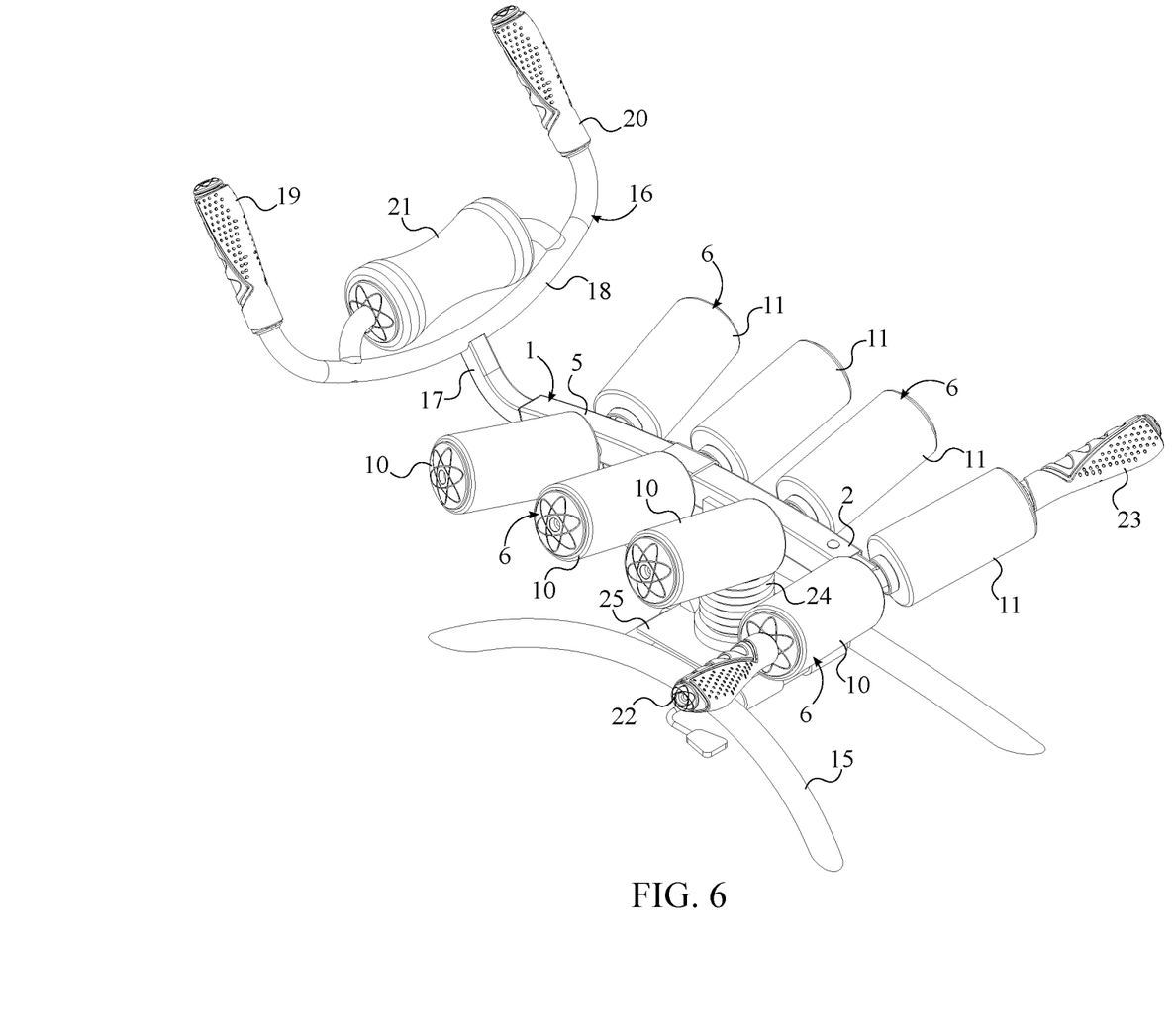
FIG. 6 is a right perspective view of a second embodiment of the present invention, wherein the second embodiment of the present invention includes rollers.
Figure 7:
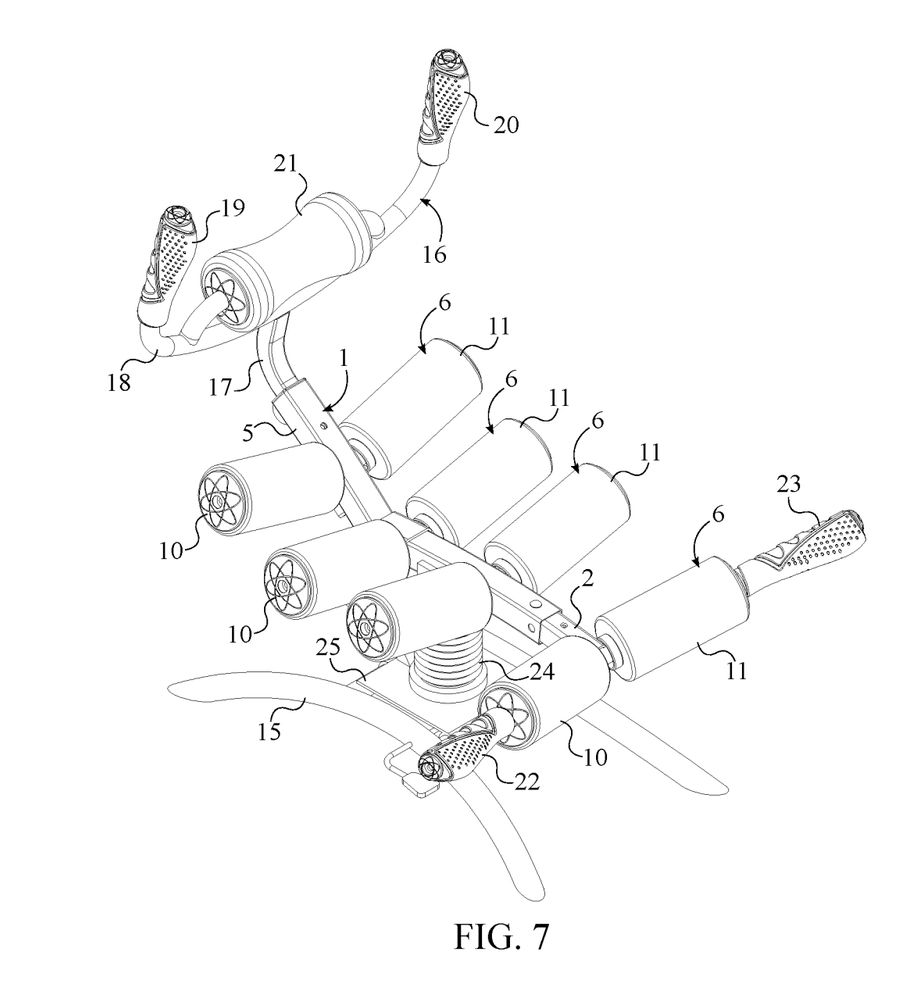
FIG. 7 is a right perspective view of the second embodiment of the present invention with the hinged frame folded and the base-adjusting beam extended.
Figure 11:
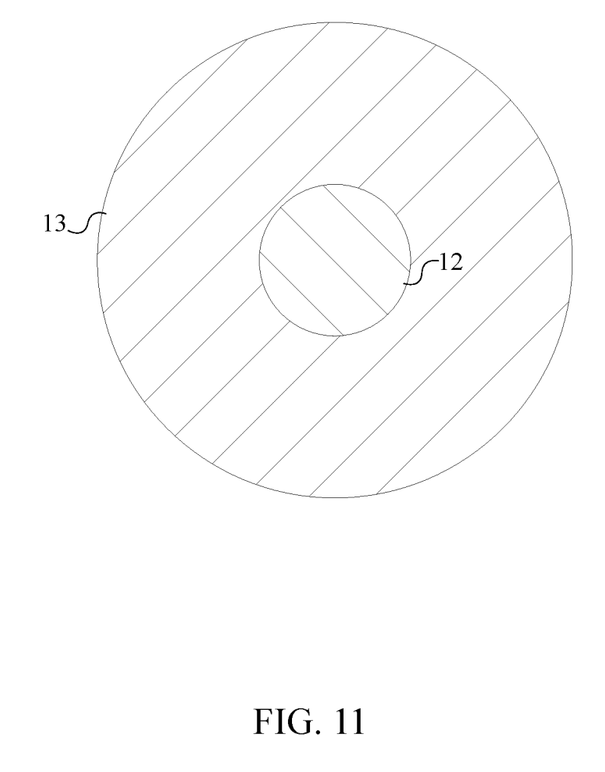
FIG. 11 is a cross-sectional schematic view of a roller of the present invention.

In a second embodiment of the present invention, shown in FIGS. 6-7, each of the plurality of back supports 6 comprises a first roller 10 and a second roller 11. The first roller 10 and the second roller 11 each comprise an arm 12 and a tubular cushion 13. This is shown in FIG. 11. The arm 12 is used as a structural support for the tubular cushion 13. The arm 12 of the first roller 10 is laterally connected to the hinged frame 1. The arm 12 of the second roller 11 is laterally connected to the hinged frame 1, opposite to the arm 12 of the first roller 10. This arrangement is used to support the user's back symmetrically across the hinged frame 1. The tubular cushion 13 is rotatably mounted about the arm 12 and is used to support a portion of while distributing weight evenly onto the arm 12. As the user performs an exercise, the tubular cushion 13 is designed to rotate so as not to hinder the movement of the user. The tubular cushion 13 has a greater surface area than the arm 12 so that the user does not experience pressure at any point on their back.

Figure 9:
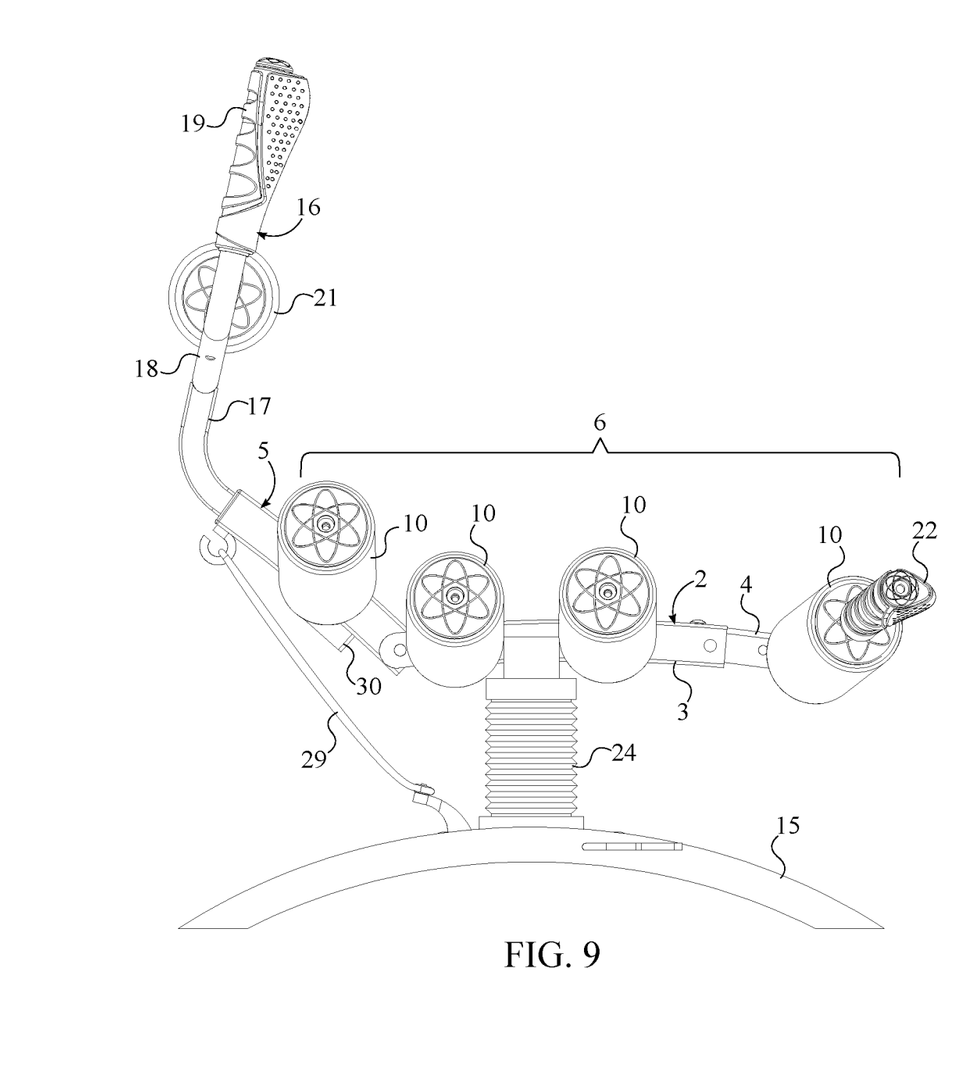
FIG. 9 is a front view of the second embodiment with the hinged frame folded and the base-adjusting beam extended.
Figure 10:
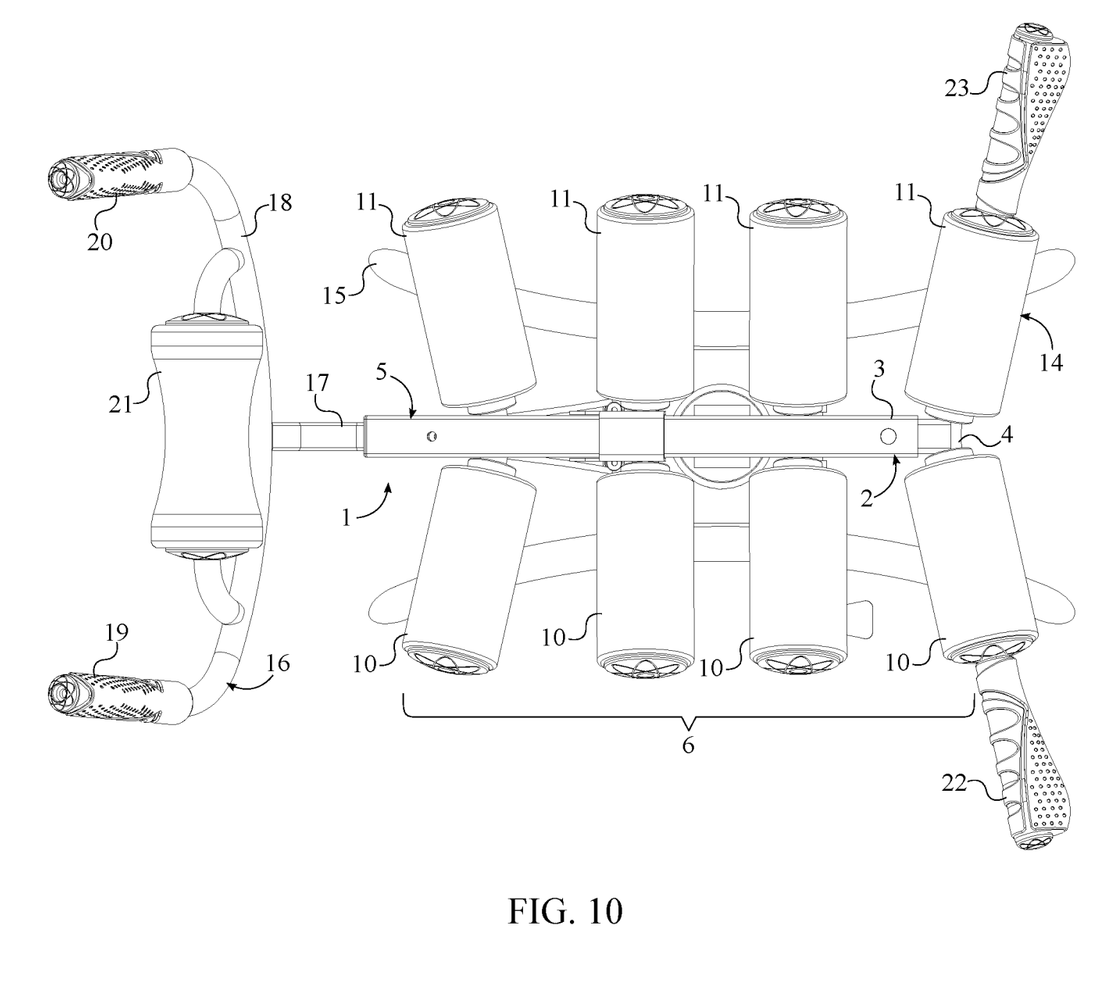
FIG. 10 is a top view of the second embodiment of the present invention.

In reference to FIG. 6 and FIGS. 9-10, an end support 14 from the plurality of back supports 6 is laterally connected to the base-adjusting beam 4. Similar to the third cushioned pad 9, the end support 14 is used to stabilize the user's lower back. The end support 14 from the plurality of back supports 6 is positioned opposite to the frame-grasping assembly 16 along the hinged frame 1. In this embodiment, the first handle 22 is connected adjacent to the arm 12 of the first roller 10 for the end support 14, opposite to the base beam 2. The second handle 23 is connected adjacent to the arm 12 of the second roller 11 of the end support 14, opposite to the base beam 2. Similar to the first embodiment of the present invention, this arrangement allows the user to hold onto the present invention at either end of the hinged frame 1.

Figure 5:
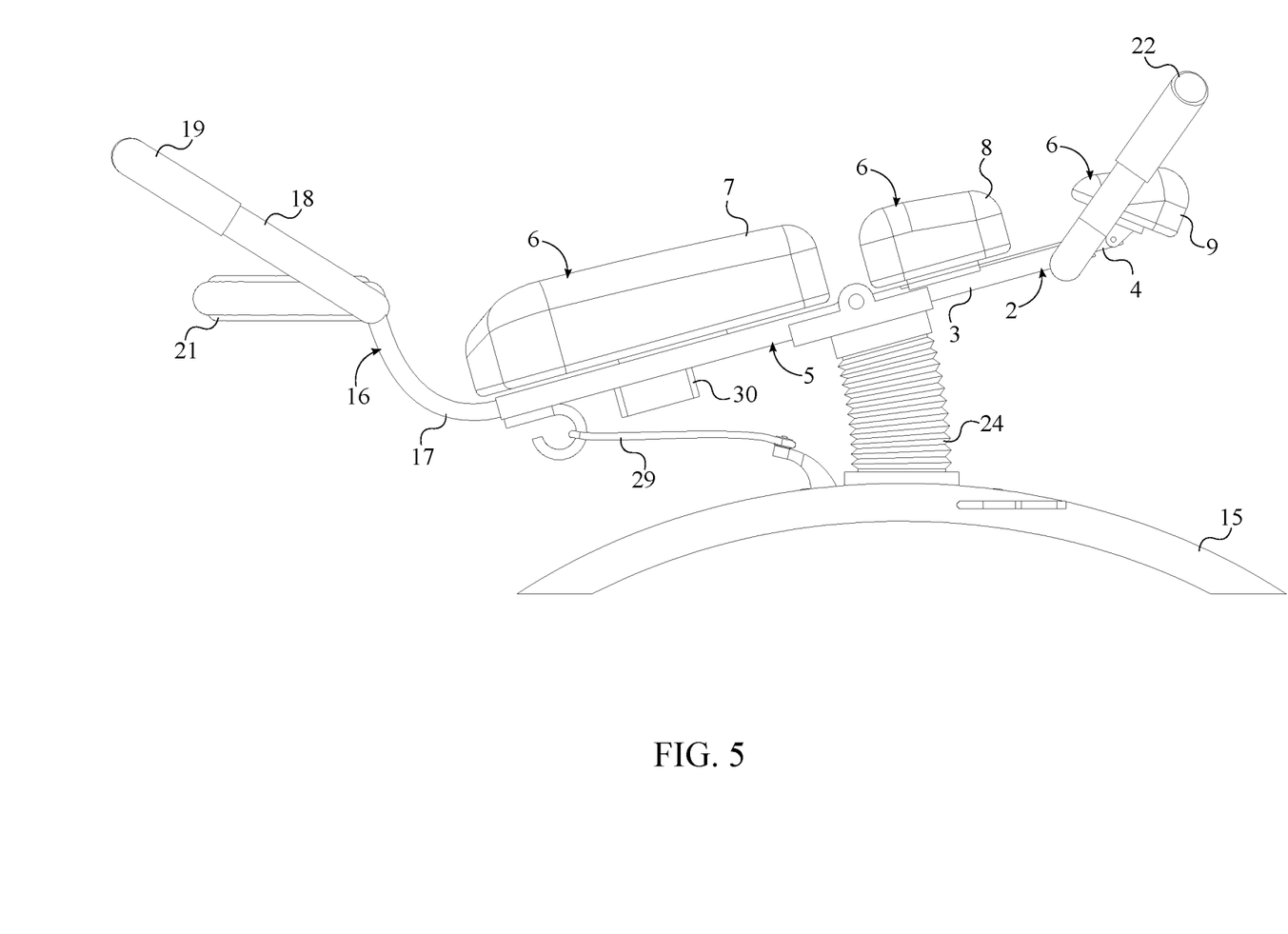
FIG. 5 is a front view of the first embodiment of the present invention with the elastic pivot resistor in a bent configuration.
Figure 8:
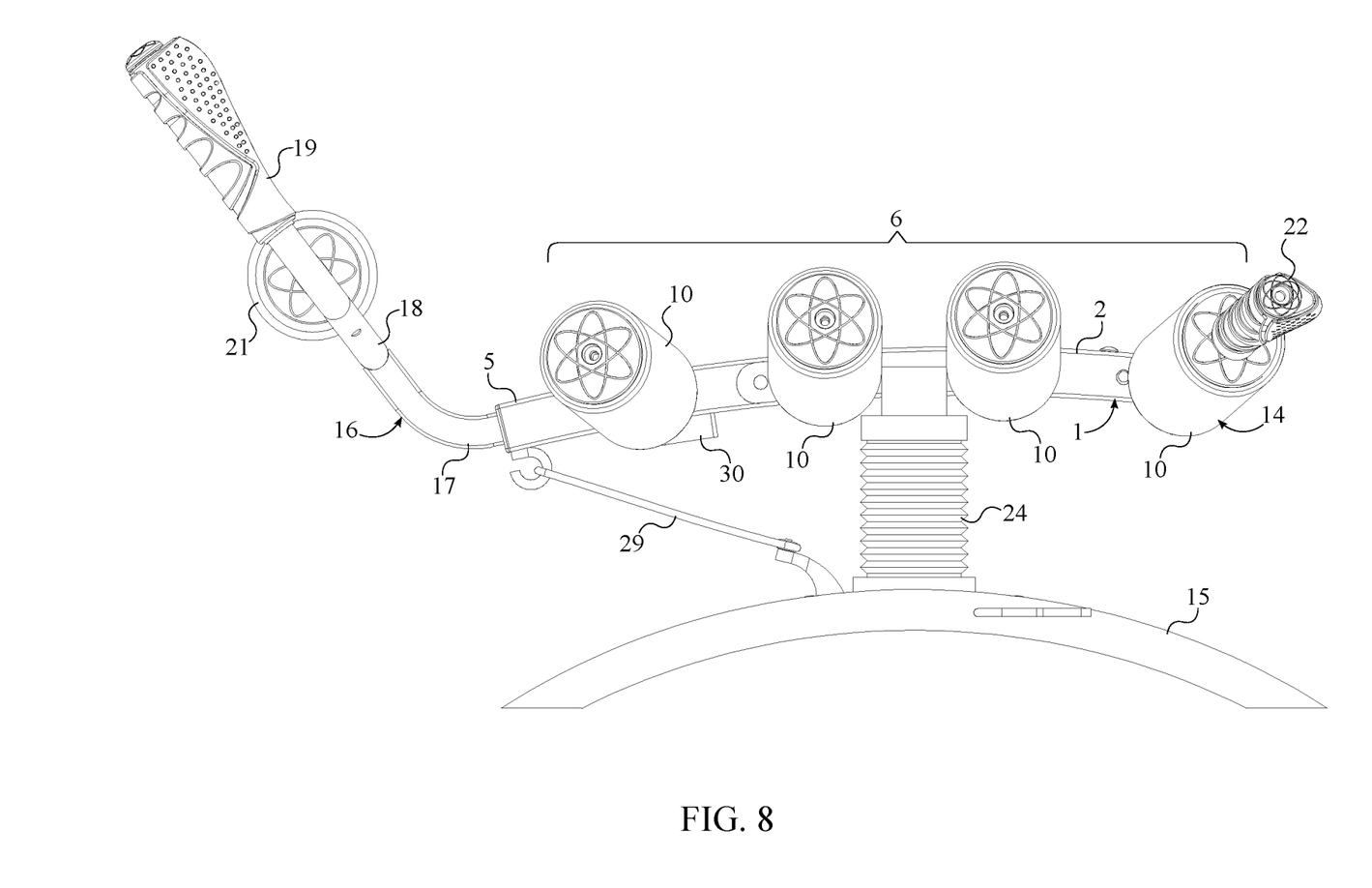
FIG. 8 is a front view of the second embodiment of the present invention.

In reference to FIG. 4 and FIG. 8, the present invention further comprises an elastic pivot resistor 24, a mounting plate 25, and a plate-locking mechanism 28. The elastic pivot resistor 24 and the mounting plate 25 are used to mount the hinged frame 1 to the base stand 15. A first edge 26 of the mounting plate 25 is hingedly connected to the base stand 15. This allows the hinged frame 1 to be rotated from the base stand 15 and into an upright position. When the user is finished exercising, this functionality permits the user to easily dismount from the present invention. A second edge 27 of the mounting plate 25 is attached to the base stand 15 by the plate-locking mechanism 28. The locking mechanism is used to secure the mounting plate 25 to the base stand 15 while the user is exercising. When finished exercising, the user may disengage the locking mechanism, releasing the second edge 27 of the mounting plate 25 from the base stand 15 so that the hinged frame 1 may rotate into an upright position. This is shown in FIG. 2. The elastic pivot resistor 24 is connected in between the base beam 2 and the mounting plate 25. The elastic pivot resistor 24 allows the hinged frame 1 to rock and twist relative to the base stand 15. The elastic pivot resistor 24 also resists the movement of the user, requiring the user to exert additional energy while exercising. In the preferred embodiment of the present invention, the elastic pivot resistor 24 is an elongated body which is positioned normal to the mounting plate 25. In reference to FIG. 5, the elastic pivot resistor 24 is able to bend, flex, or twist depending on the exercise performed by the user. The elastic pivot resistor 24 may be a coil spring, a rubber air spring, a rubber hollow spring, a solid rubber spring, a rubber air suspension spring, a rubber cylindrical block, a rubber cylindrical elasticity block, a macromolecule elasticity component, or a coil spring encased in a steel spring noise shock absorber. Further, any other type of spring or system that operates similarly to a coil spring may be used.

In reference to FIG. 4 and FIG. 8, the present invention further comprises an elastic movement resistor 29. The elastic movement resistor 29 is used to resist folding motions of the hinged frame 1. As a result, the user is required to exert a greater force to perform an exercise. The elastic movement resistor 29 is attached in between the pivoting portion and the base stand 15. As the pivoting beam 5 is folded, the elastic movement resistor 29 is stretched in between the pivoting beam 5 and the base stand 15. In the preferred embodiment of the present invention, the elastic movement resistor 29 is an elastic band. Alternatively, the elastic movement resistor 29 may be a tension spring. Furthermore, the present invention may be equipped with one or more elastic movement resistors 29 so that varying resistances may be achieved.

In reference to FIG. 4 and FIG. 8, the present invention further comprises a vibrating device 30. The vibrating device 30 is laterally attached to the pivoting beam 5 and is used to stimulate blood flow in the user's body and may also be used to massage muscles. The vibrating device 30 is positioned adjacent to the base beam 2. The positioning of the vibrating device 30 allows the vibrating device 30 to affect the user's entire back.

Although the invention has been explained in relation to its preferred embodiment, it is to be understood that many other possible modifications and variations can be made without departing from the spirit and scope of the invention as hereinafter claimed.

What is claimed is:

1. A pivoting abdominal exercise machine comprises:
   a hinged frame;
   a plurality of back supports;
   a base stand;
   a frame-grasping assembly;
   the hinged frame comprises a base beam and a pivoting beam;
   the pivoting beam being hingedly and adjacently connected to the base beam;
   the frame-grasping assembly being adjacently mounted to the pivoting beam, opposite to the base beam;
   each of the plurality of back supports being laterally mounted to the hinged frame;
   the plurality of back supports being distributed along the hinged frame;
   the base beam being pivotably mounted onto the base stand;
   an elastic pivot resistor;
   a mounting plate;
   a plate-locking mechanism;
   a first edge of the mounting plate being hingedly connected to the base stand;
   a second edge of the mounting plate being attached to the base stand by the plate-locking mechanism; and
   the elastic pivot resistor being connected in between the base beam and the mounting plate.

2. The pivoting abdominal exercise machine as claimed in claim 1 comprises:
   the frame-grasping assembly comprises a length-adjusting bar, a handlebar, a first grip, a second grip, and a headrest;
   the length-adjusting bar being telescopically mounted into the pivoting beam;
   the handlebar being connected adjacent to the length-adjusting bar, opposite to the pivoting beam;
   the first grip being connected adjacent to the handlebar;
   the second grip being connected adjacent to the handlebar, opposite to the first grip;
   the headrest being laterally connected about the handlebar; and
   the headrest being positioned in between the first grip and the second grip.

3. The pivoting abdominal exercise machine as claimed in claim 1 comprises:
   the plurality of back supports comprises a first cushioned pad and a second cushioned pad;
   the first cushioned pad being laterally connected to the pivoting beam;
   the second cushioned pad being laterally positioned on the base beam; and
   the second cushioned pad being slidably mounted along the base beam.

4. The pivoting abdominal exercise machine as claimed in claim 1 comprises:
   the base beam comprises a base-supporting beam and a base-adjusting beam;
   the plurality of back supports comprises a third cushioned pad;
   the base adjusting beam being telescopically mounted into the base-supporting beam; and
   the third cushioned pad being laterally connected to the base-adjusting beam.

5. The pivoting abdominal exercise machine as claimed in claim 1 comprises:
   a first handle;
   a second handle;
   the first handle being laterally connected to the base beam;
   the second handle being laterally connected to the base beam, opposite to the first handle; and
   the first handle and the second handle being positioned offset from the pivoting beam along the base beam.

6. The pivoting abdominal exercise machine as claimed in claim 1 comprises:
   each of the plurality of back supports comprises a first roller and a second roller;
   the first roller and the second roller each comprise an arm and a tubular cushion;
   the arm of the first roller being laterally connected to the hinged frame;
   the arm of the second roller being laterally connected to the hinged frame, opposite to the arm of the first roller; and
   each tubular cushion being rotatably mounted about each respective arm.

7. The pivoting abdominal exercise machine as claimed in claim 6 comprises:
   a first handle;
   a second handle;
   an end support from the plurality of back supports being positioned opposite to the frame-grasping assembly along the hinged frame;
   the first handle being connected adjacent to the arm of the first roller, opposite to the base beam; and the second handle being connected adjacent to the arm of the second roller, opposite to the base beam.

8. The pivoting abdominal exercise machine as claimed in claim 1 comprises:
   the base beam comprises a base-supporting beam and a base-adjusting beam;
   the base-adjusting beam being telescopically mounted into the base support beam; and
   an end support from the plurality of back supports being laterally connected to the base-adjusting beam.

9. The pivoting abdominal exercise machine as claimed in claim 1 comprises:
   the elastic pivot resistor being an elongated body; and
   the elastic pivot resistor being positioned normal to the mounting plate.

10. The pivoting abdominal exercise machine as claimed in claim 1 comprises:
    an elastic movement resistor; and
    the elastic movement resistor being attached in between the pivoting beam and the base stand.

11. The pivoting abdominal exercise machine as claimed in claim 10, wherein the elastic movement resistor is a tension spring.

12. The pivoting abdominal exercise machine as claimed in claim 10, wherein the elastic movement resistor is an elastic band.

13. The pivoting abdominal exercise machine as claimed in claim 1 comprises:
   a vibrating device;
   the vibrating device being laterally attached to the pivoting beam; and
   the vibrating device being positioned adjacent to the base beam.

* * * * *